US011553715B2

(12) United States Patent
Shi et al.

(10) Patent No.: US 11,553,715 B2
(45) Date of Patent: Jan. 17, 2023

(54) SYNTHESIS AND FORMULATION OF LIGNIN DERIVED COMPOUNDS AS TREATMENT OF PLANT DISEASES (71) Applicant: University of Kentucky Research Foundation, Lexington, KY (US)

(72) Inventors: Jian Shi, Lexington, KY (US); Ryan M. Kalinoski, Oak Forest, IL (US)

(*) Notice: Subject to any disclaimer, the term of this patent is extended or adjusted under 35 U.S.C. 154(b) by 245 days.

(21) Appl. No.: 16/923,434

(22) Filed: Jul. 8, 2020

(65) Prior Publication Data

US 2021/0007352 A1 Jan. 14, 2021

Related U.S. Application Data (60) Provisional application No. 62/871,648, filed on Jul. 8, 2019.

(51) Int. Cl.
| | |
|---|---|
| A01N 37/12 | (2006.01) |
| A01N 37/00 | (2006.01) |
| C07G 1/00 | (2011.01) |
| A01N 31/16 | (2006.01) |
| C11B 1/10 | (2006.01) |
| A01N 31/08 | (2006.01) |
| A01N 37/10 | (2006.01) |

(52) U.S. Cl.
CPC ............. *A01N 37/12* (2013.01); *A01N 31/08* (2013.01); *A01N 31/16* (2013.01); *A01N 37/10* (2013.01); *C07G 1/00* (2013.01); *C11B 1/10* (2013.01)

(58) Field of Classification Search
CPC ........ A01N 37/12; A01N 31/08; A01N 31/16; A01N 37/10; C07G 1/00; C11B 1/10
See application file for complete search history.

(56) References Cited

U.S. PATENT DOCUMENTS

| | | | |
|---|---|---|---|
| 7,998,315 | B2 | 8/2011 | Bridgwater et al. |
| 8,846,992 | B2 | 9/2014 | Lotero et al. |
| 8,853,478 | B2 | 10/2014 | Machhammer et al. |
| 9,102,584 | B2 | 8/2015 | Powell et al. |
| 9,334,450 | B2 | 5/2016 | Delledonne et al. |
| 10,150,790 | B2 | 12/2018 | Samec et al. |
| 2018/0195006 | A1 | 7/2018 | Dayton et al. |

FOREIGN PATENT DOCUMENTS

WO 2018/109600 A1 * 6/2018

OTHER PUBLICATIONS

Liu, et al.,Catalytic oxidation of lignin to valuable biomass-based platform chemicals: A review, Fuel Processing Technology, 191, 2019, pp. 181-201.

Chio, et al., Lignin utilization: A review of lignin depolymerization from various aspects, Renewable and Sustainable Energy Reviews 107 (2019) 232-249.

Verziu, et al., Hydrogenolysis of lignin over Ru-based catalysts: The role of the ruthenium in a lignin fragmentation process. Molecular Catalysis 450 (2018) 65-76.

Arni, et al., Extraction and isolation methods for lignin separation from sugarcane bagasse: A review, Industrial Crops & Products 115 (2018) 330-339.

Hashmi, et al., Hydrothermolysis of organosolv lignin for the production of bio-oil rich in monoaromatic phenolic compounds, Fuel Processing Technology 168 (2017) 74-83.

Huang, et al., Catalytic Polymerization of Lignin in Supercritical Ethanol, ChemSusChem 2014, 7, 2276-2288.

Kalogiannis, et al., Pyrolysis of lignin with 2DGC quantification of lignin oil: Effect of lignin type, process temperature and ZSM-5 in situ upgrading, Journal of Analytical and Applied Pyrolysis 115 (2015) 410-418.

Hossain, et al., Ionic Liquids for Lignin Processing: Dissolution, Isolation, and Conversion, Aust. J. Chem. 2012, 65, 1465-1477.

Werhan, et al., Separation of lignin oxidation products by organic solvent nanofiltration, Journal of Membrane Science 423-424 (2012) 404-412.

Hossain, et al., Toxicity of lignin, cellulose and hemicellulose-pyrolyzed bio-oil combinations: Estimating pesticide resources, Journal of Analytical and Applied Pyrolysis 99 (2013) 211-216.

Zhao, et al., Production of pulp, ethanol and lignin from sugarcane bagasse by alkali-peracetic acid delignification, Biomass and bioenergy 35, 2011, pp. 2874-2882.

Fahmi, et al., The effect of lignin and inorganic species in biomass on pyrolysis oil yield, quality and stability, Fuel 87 (2008) 1230-1240.

Espinoza-Acosta, J. L., Torres-Chávez, P. I., Ramírez-Wong, B., López-Saiz, C. M., and Montaño-Leyva, B. (2016) Antioxidant, antimicrobial, and antimutagenic properties of technical lignins and their applications, BioResources 11, 5452-5481.

Zemek, et al., Antibiotic properties of lignin components, Folia Microbiol 24, (1979) 483-486.

Pandey, et al., Lignin Depolymerization and Conversion: A Review of Thermochemical Methods, Chemical Engineering & Technology 34, (2011) 29-41.

Sun, et al., Bright Side of Lignin Depolymerization: Toward New Platform Chemicals, Chemical Reviews 118, (2018) 614-678.

Ren, et al., Separation of chemical groups from bio-oil water-extract via sequential organic solvent extraction, Journal of Analytical and Applied Pyrolysis 123, (2017) 30-39.

Zhou, et al. Catalytic in Situ Hydrogenolysis of Lignin in Supercritical Ethanol: Effect of Phenol, Catalysts, and Reaction Temperature, ACS Sustainable Chemistry & Engineering 6, (2018) 6867-6875.

Wei, et al., Liquid-Liquid Extraction of Biomass Pyrolysis Bio-oil, Energy & Fuels 28, (2014) 1207-1212.

De Souza et al., Antibacterial and antifungal activities of pyroligneous acid from wood of *Eucalyptus urograndis* and *Mimosa tenuiflora*, J Appl Microbiol 124, (2018) 85-96.

(Continued)

*Primary Examiner* — Alma Pipic
(74) *Attorney, Agent, or Firm* — Stites & Harbison PLLC; Mandy Wilson Decker; Gary N. Stewart (57) ABSTRACT The present invention relates to a methods for producing bio-oils from vegetation high in lignin. The invention further relates to antimicrobial compositions comprising bio-oil extracted from vegetation high in lignin.

8 Claims, 5 Drawing Sheets

(56) References Cited

OTHER PUBLICATIONS

Greenberg, et al., Naturally Occurring Phenolic Antibacterial Compounds Show Effectiveness against Oral Bacteria by a Quantitative Structure-Activity Relationship Study, J. Agric. Food Chem. 56, (2008) 11151-11156.
Dong, et al., Antimicrobial and antioxidant activities of lignin from residue of corn stover to ethanol production. Industrial Crops and Products, 34(3), (2011) 1629-1634.
Hwang, et al., Antimicrobial effect of the wood vinegar from *Cryptomeria japonica* sapwood on plant pathogenic microorganisms. Journal of microbiology and biotechnology, 15(5), (2005) 1106-1109.
Taguri, T., Tanaka, T., & Kouno, I. (2006). Antibacterial spectrum of plant polyphenols and extracts depending upon hydroxyphenyl structure. Biological and Pharmaceutical Bulletin, 29(11), 2226-2235.
Hossain, et al., Insecticidal and anti-microbial activity of bio-oil derived from fast pyrolysis of lignin, cellulose, and hemicellulose. Journal of pest science, 88(1), (2015). 171-179.
Yang, et al., Valorization of acid isolated high yield lignin nanoparticles as innovative antioxidant/antimicrobial organic materials. ACS Sustainable Chemistry & Engineering, 6(3), (2018) 3502-3514.

\* cited by examiner

SYNTHESIS AND FORMULATION OF LIGNIN DERIVED COMPOUNDS AS TREATMENT OF PLANT DISEASES

RELATED APPLICATIONS

This application claims priority from U.S. Provisional Patent Application No. 62/871,648 filed on Jul. 8, 2019 the entire disclosure of which is incorporated herein by this reference.

GOVERNMENT INTEREST

This invention was made with government support under grant numbers 1355438 and 1632854 awarded by the National Science Foundation. The government has certain rights in the invention.

TECHNICAL FIELD

The present invention relates to a methods for producing bio-oils from vegetation high in lignin. The invention further relates to antimicrobial compositions comprising bio-oil extracted from vegetation high in lignin.

BACKGROUND

To circumvent the overuse of fossil fuels for energy and chemical production, lignocellulosic biomass has become a promising feedstock to produce biofuels and bioproducts. Lignocellulose is mainly comprised of cellulose, hemicellulose, and lignin. In a biorefinery, the three components are fractionated using thermochemical or biochemical methods. Cellulose and hemicelluloses can be used to create bio-fuels like ethanol or bio-products like plastics. On the other hand, lignin in its polymeric form has no profitable uses besides to be combusted in a boiler to produce heat, stream and electricity in current biorefinery industries[1]. However, since lignin is comprised of a variety of polyphenolic compounds, creating value from lignin by utilizing it as a source of natural phenolics will not only generate extra profit for a biorefinery but also reduce the greenhouse gas emissions from burning lignin.

Currently, overuse of antimicrobial agents has become a growing problem facing our society. Because of this, there has been a recent spike in the evolution of antimicrobial resistant organisms and a need for researchers to create new and novel antimicrobials. Current research trends are examining phenolic compounds for their antimicrobial properties[2]. Since lignin is considered a waste product from different industrial sectors (i.e. paper-pulp and biorefineries) and has a polyphenolic structure, lignin has the potential to become a future source of antimicrobial compounds.

The native lignin in plants has been considered to play a notable role in the plants defense by providing antimicrobial, antifungal, antiviral, antioxidant, insecticidal and anti-feeding properties[3]. Lignin's source of antimicrobial properties are due to the phenolic subunits that comprise lignin's polyphenolic structure[4]. These polyphenolic compounds are thought to act as ionophores that increase ion permeability in the cell causing cell death or damage the cell membranes of both gram positive and negative bacteria causing cell lysis[5-7]. In the literature, lignin concentration, the exact structure of lignin phenolic subunits, and origin of the extracted lignin are drivers affecting its antimicrobial properties, that also depends on the microorganism being tested[3, 5, 8]. While a variety of lignin's from the Kraft process have had notable antimicrobial properties, lignin model monomers have been shown to have a greater antimicrobial affect compared to the larger and not well defined polyphenolic structures comprising Kraft and organosolv lignins[9]. Thus, to increase the antimicrobial properties of extracted lignin's its polyphenolic structure must be depolymerize into smaller units.

Since lignin is nonlinearly and randomly linked polyphenolic complex, containing ether linkages such as β-O-4, α-O-4, and 4-O-5, as well as condensed linkages (i.e. 5-5, β-β, β-5 and β-1), lignin is highly recalcitrant toward depolymerization which makes it difficult for effective valorization into low molecular weight phenolics[10, 11]. A variety of thermochemical methods have been employed to depolymerize lignin into bio-oils containing high amounts of monomeric phenolics, including pyrolysis[12], hydrolysis[13, 14], and hydrogenolysis[10, 15]. However, pyrolysis and hydrolysis methods lead to increased lignin condensation and repolymerization due to reactive phenolic monomers and free-radical reactions that reduces bio-oil and monomer yields[12, 14]. Therefore, since hydrogenolysis causes reductive bond cleavage of lignan linkages, that are hydrogenated and less reactive, hydrogenolysis has received increased attention[16, 17]. While more traditional hydrogenolysis methods utilize $H_2$ gas as a hydrogen donating source to cleave ether linkages[18], catalytic transfer hydrogenolysis (CTH) offers the use of inexpensive organic alcohols and catalysts to generate hydrogen molecules at lower temperatures and pressures[19]. While a variety of hydrogen donating agents have been utilized (i.e. formic acid, methanol, ethanol, teralin, water, isopropyl alcohol, acetonitrile, and acetone) to depolymerize lignin substrates[20], ethanol at its supercritical state has been found to produce less solid residues, facilitate higher biomass conversion, and even act as a capping agent that reduces phenolic monomer repolymerization[21, 22]. Furthermore, lignin depolymerization products produced by CTH are usually a complex mixture of a variety of aromatic monomers and oligomers. Thus, to better identify key lignin derived compounds that can improve lignin valorization, it is necessary to investigate a separating method that can efficiently, and selectivity recover specific compounds. Liquid to liquid extraction is a method of separating compounds based on solubility in two different immiscible liquids. Due to its cost effectiveness and ability to recover solvents more readily, it is a more attractive option compared to chromatography or membrane filtration when separating aromatic/phenolic compounds from lignocellulosic derived bio-oils[23-28]. Previous work with solvent extraction has shown good performance in extracting phenolic compounds utilizing solvents like chloroform, hexane and ethyl acetate individually and sequentially[29, 30]. Ren et al.[29] found that by using chloroform and ethyl acetate sequentially to extract compounds from pyrolytic oils created improved phenolic extraction yields compared to utilizing the solvents individually or using non-polar solvents. However, because chloroform and ethyl acetate are both polar, the use of additional non-polar solvents in the sequential extraction process could further improve specificity.

BRIEF DESCRIPTION OF THE DRAWINGS

The presently-disclosed subject matter will be better understood, and features, aspects and advantages other than those set forth above will become apparent when consideration is given to the following detailed description thereof. Such detailed description makes reference to the following drawings, wherein.

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

SUMMARY

In accordance with the purpose(s) of the invention, as embodied and broadly described herein, the invention, in one aspect, relates to methods for extracting bio-oils from vegetation containing high sugar and high lignin content.

One embodiment of the present invention is a method for extracting bio-oils from vegetation containing high sugar and high lignin content comprising the following steps:
 a) treating a high sugar, high lignin vegetation with 70 kg NaOH per ton of the vegetation in a 1:12 solid:liquid ratio loading at 92° C. for 2 hours to produce a lignin residue;
 b) disk refining the lignin residue at 200 kwh/ODMT followed by enzymatic hydrolysis;
 c) soaking the lignin residue in a solution of 0.1M NaOH until reaching a pH of 12.5;
 d) centrifugation of the solution followed by filtration;
 e) precipitating the lignin in the filtrate by using 2 M H2SO4 to reach a pH of 3.0;
 f) filtering the precipitated lignin;
 g) freeze-drying the lignin;
 h) performing catalytic transfer hydrogenolysis in ethanol with a metal/C catalyst;
 i) separating the solute from the solution via centrifugation;
 j) collecting the solution and diluting in a water:ethanol solvent
 k) extracting the solution from step
 j) sequentially: first in hexanes, followed by petroleum ether, then chloroform, and finally ethyl acetate to produce 5 total fractions; and
 l) evaporating the fractions by vacuum evaporation until a solvent free bio-oil is produced.

Further embodiments of the present invention include administering the bio-oil onto a surface in need thereof. Other embodiments of the instant invention include a method where the surface is on an organism. In some embodiments of the present invention, the organism is a plant. In further embodiments, the method further includes further fractioning the bio-oil into monomers.

Another embodiment of the present invention includes an antimicrobial composition comprising: the bio-oil produced by a method disclosed herein. In a further embodiment of the instant invention, the composition further comprises ethanol and water.

In another embodiment, the present invention relates to an antimicrobial composition comprising at least one monomer produced by a method disclosed herein, ethanol and water. In a further embodiment of the present invention, the monomer is selected from the group consisting of: homosyringic acid, 4-ethyl-phenol, syringol, methyl 4-hydroxyhdrocinamate, 4-ethylguaiacol, ethyl-beta-(4-hydroxy-3methoxyphenyl)-propionate, 5-tert-butylpyrogallol, creosol, 4-methoxy-3-(methoxymethyl)-phenol, 4-propylguaiacol, 2,5-dimethoxybenzyl alcohol, ethyl homovanillate, homovanillyl alcohol, acetosyringone, (3,4-dimethoxyphenyl)-methoxymethanol, tyrosol, and combinations thereof.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which need to be independently confirmed.

Definitions

While the terms used herein are believed to be well understood by those of ordinary skill in the art, certain definitions are set forth to facilitate explanation of the presently-disclosed subject matter.

Unless defined otherwise, all technical and scientific terms used herein have the same meaning as is commonly understood by one of skill in the art to which the invention(s) belong.

All patents, patent applications, published applications and publications, GenBank sequences, databases, websites and other published materials referred to throughout the entire disclosure herein, unless noted otherwise, are incorporated by reference in their entirety.

Where reference is made to a URL or other such identifier or address, it understood that such identifiers can change and particular information on the internet can come and go, but equivalent information can be found by searching the internet. Reference thereto evidences the availability and public dissemination of such information.

As used herein, the abbreviations for any protective groups, amino acids and other compounds, are, unless indicated otherwise, in accord with their common usage, recognized abbreviations, or the IUPAC-IUB Commission on Biochemical Nomenclature (see, Biochem. (1972) 11(9): 1726-1732).

Although any methods, devices, and materials similar or equivalent to those described herein can be used in the practice or testing of the presently-disclosed subject matter, representative methods, devices, and materials are described herein.

The present application can "comprise" (open ended) or "consist essentially of" the components of the present invention as well as other ingredients or elements described herein. As used herein, "comprising" is open ended and means the elements recited, or their equivalent in structure or function, plus any other element or elements which are not recited. The terms "having" and "including" are also to be construed as open ended unless the context suggests otherwise.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, in some embodiments ±0.1%, and in some embodiments ±0.01% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the term "solvent free" refers to compositions that are 100%, to 90% by weight free of common solvents used in chemical synthesis or purification. Common solvents include but are not limited to hexane, petroleum ether, chloroform, and ethyl acetate.

As used herein a surface in need of administration of bio-oil includes surfaces that are known to be contaminated by microbes or surfaces reasonably believed to be contaminated by microbes. A surface in need of administration of bio-oil may also include surfaces that need to be protected from microbial contamination.

As used herein, the term "microbes" may include but are not limited to: *B. subtilis, E. coli, S. epidermidis, X. euvesicatoria, S. cerevisiae*, and *L. amylovorus*.

As used herein, the term "organism" may refer to animals, various types of vegetation such as plants, trees, or grasses.

EXAMPLES

The presently-disclosed subject matter is further illustrated by the following specific but non-limiting examples. The following examples may include compilations of data that are representative of data gathered at various times during the course of development and experimentation related to the present invention.

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

Materials and Methods
Alkali-extracted Lignin Purification and Analysis

Corn stover was alkaline pretreated at the National Renewable Energy Laboratory (NREL) using 70 kg NaOH/tonne of corn stover with 1:12 solid: liquid ratio loading at 92° C. for 2 h. The lignin residue was produced after disk refining (200 kwh/ODMT) and enzymatic hydrolysis (48 mg CTec2 and 12 mg HTec2 per gram of cellulose for 36 hour)[31]. Utilizing a previously reported lignin precipitation methods[32], the alkali extracted lignin was further purified to remove the residual carbohydrates. In short, the lignin residue was soaked in 0.1 M NaOH until it reached a pH of 12.5, then the solution was centrifuged at 4000 rpm for 10 min and filtered through 11 μm pore size Whatman No 1 filter paper to remove undissolved carbohydrates. Then the lignin was precipitated by decreasing pH to 3.0 with 2 M $H_2SO_4$ and filtered in same manner after three washes with 70° C. DI water. The resulting lignin was then freeze-dried using FreeZone 6 liter console freeze dry system (Labconco, Kansas City, Mo.), at −50° C. under 0.1-0.2 mBar vacuum for 72 hrs.

Structural carbohydrates and lignin composition of the resulting purified lignin samples were determined by compositional analysis according to an NREL laboratory analytical procedure[33]. The sugar concentration was determined by HPLC (Ultimate 3000, Dionex Corporation, Sunnyvale, Calif., US) equipped with a refractive index detector and using a Bio-Rad Aminex HPX-87H column and guard assembly.

Catalytic Transfer Hydrogenolysis (CTH)

CTH was performed using a Parr Reactor (Parr Instruments, Series 4560 Mini Reactor, Moline, Ill.,) at a set temperature of 270±5° C. for 1 h under a $N_2$ atmosphere and stirring speed set at 600 rpm. Reactor loading was done at a lignin-to-catalyst-to-solvent mass ratio of 2:1:30[17], utilizing ethanol as solvent and 5% Ru/C as the catalyst. When reaction completed, forced air was used to cool the reactor to about 100° C. and followed by ice to further cool the reactor to room temperature. All contents in the reactor were transferred out by rinsing with ethanol, and the liquid and solids were separated by centrifuging at 4000 rpm for 10 min. Solid fraction and a subsample of liquid fraction were dried in a vacuum oven at 60° C. for 48 h to remove the solvent for mass balance and bio-oil recovery. The percent oil, solid, and gas yields by weight were calculated as percentage of the loaded lignin sample[16].

Sequential Extraction

Figure 1:
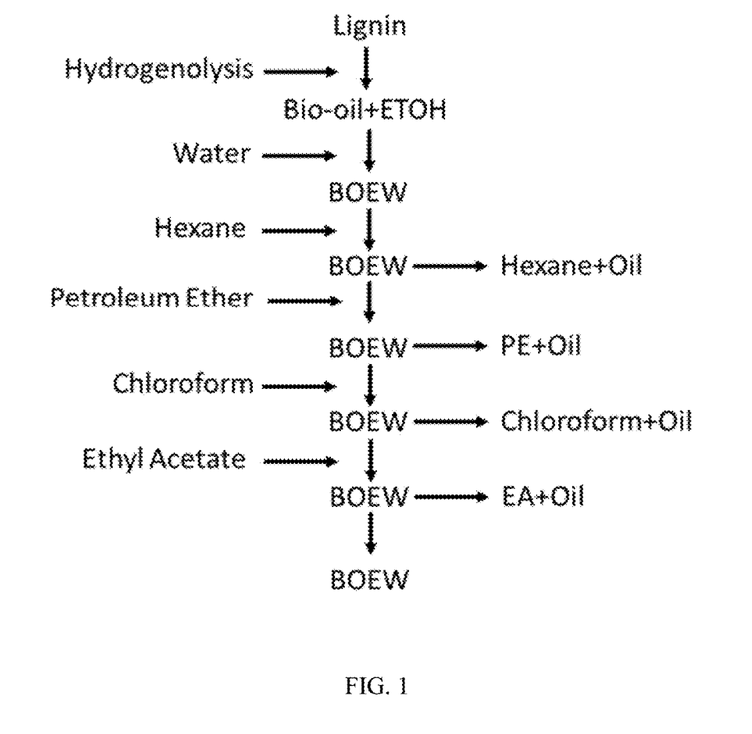
FIG. 1 shows the sequential extraction flow chart (BOEW is bio-oil ethanol and water mixture).

The liquid fraction collected from CTH was diluted with water to a water-ethanol ratio of 80:20 v/v, before sequential extraction procedures. The solvents used were added in order from least polar to most polar based on previous studies[29], and consisted of four solvents: hexane, petroleum ether, chloroform, and ethyl acetate. Each solvent was added to the same water-ethanol-oil mixture at a 1:1 ratio and vigorously shaken for 15 min., the immiscible layers were separated via centrifuging at 4000 rpm for 5 min, then the solvent was removed and replaced by the next solvent in the order described above and in FIG. 1. Therefore, a total of five fractions were obtained from the sequential extraction process, one from each solvent and an additional fraction that consisted of the water-ethanol mixture with residuals oil not extracted from the solvents. Solvent was then evaporated under vacuum at 60° C. for 48 h to obtain a dry bio-oil. The percent oil recovery from each fraction was calculated by dividing the mass of dried oil from individual fraction by the total mass of all fractions combined.

Gel Permeation Chromatography (GPC)

The weight-average molecular weight (Mw) and the number-average molecular weight (Mn) of the lignin sample, raw bio-oil, and sequential extraction fractions were determined using GPC[34]. An Ultimate3000 HPLC system equipped with an Ultra Violet (UV) detector and Mixed-D PLgel column (5 μm particle size, 300 mm×7.5 mm i.d., linear molecular weight range of 200 to 400,000 u, Polymer Laboratories, Amherst, Mass.) were utilized. Separation was accomplished in a mobile phase of tetrahydrofuran (THF) at a flow rate of 0.5 ml minutes$^{-1}$, at 50° C. Elution profiles of materials were monitored at UV absorbance of 280 nm and calibrated using low molecular weight polystyrene standards (Product No. 48937, Sigma-Aldrich). Polydispersity Index (PDI) was calculated using the equation: PDI=Mw/Mn[34].

Gas Chromatography-Mass Spectrometry (GC/MS)

The raw and sequentially extracted bio-oils dissolved in ethanol and identified and quantified by GC/MS using a Agilent 7890B GC coupled 5977B MS with an HP-5 ms (60 m×0.32 mm) capillary column. The temperature program started at 40° C. with a holding time of 6 min and increased to 240° C. at 4° C. min$^{-1}$ with a holding time of 7 min, finally the temperature was raised to 280° C. at 20° C. min$^{-1}$ with a holding time of 8 min. Helium was used as a carrier gas with a flow rate of 1.2 mL min$^{-1}$. Helium was used as a carrier gas at a flow rate of 1.2 mL min$^{-1}$. Calibration curves were created using commercially available pure compounds: guaiacol, syringaldehyde, vanillin, and 4-propylphenol (Sigma Aldrich, St. Louis, Mo., USA).

Example 2

Microbial Cultivation

USDA Agricultural Research Service Culture Collection (NRRL) provided the *Escherichia coli* (NRRL B-409), *Lactobacillus amylovorus* (B-4540), *Saccharomyces cerevisiae* (NRRL Y-567), *Staphylococcus epidermidis* (NRRL B-4268), and *Bacillus subtilis* (B-354) strains. Each microbe was grown on the recommended liquid media by NRRL with *E. coli* using TGY media (tryptone 5 g/L, yeast extract 5 g/L, glucose 1 g/L, dipotassium phosphate 1 g/L), *L. amylovorus* using M.R.S broth (Oxoid, CM0359), *S. cerevisiae* using YPD media (Fisher BioReagents™, BP2469), *S. epidermidis* using nutrient broth (BD Difco™, 234000), and *B. subtilis* using LB broth (Fisher BioReagents™, BP9723). Frozen cultures were prepared by first growing each microbe in liquid culture at 180 rpm shaking speed for 12 h at 37° C., besides *S. cervisiae* which was grown at 32° C. These cultures were pelletized via centrifugation and washed with sterile media, then 500 μL of the washed cultures were added to 500 μL of sterilized 50% glycerol in a 2 mL cryovial and frozen at −80° C. until use.

Antimicrobial Assay

Frozen cultures of each microbe were first revived by adding cryovial contents to liquid media and allowing to grow for 12 h at 180 rpm shaking speed and respective incubation temperature above. Afterwards the cells were pelletized, washed, and resuspended in fresh liquid media. To test for the bio-oil and sequential extraction fractions' antimicrobial properties, each microbe was cultivated in 48-well plates at preset bio-oil loadings and the $OD_{600}$ was monitored for 30 h with time points taken at 0, 6, 10, 18, and 30 h. These time points were previously found to represent key points of microbial growth curves based on preliminary tests. All wells were brought to an $OD_{600}$ of 0.2 prior to growth, and the lignin derived oils were tested at 0.5, 1.0, 1.5, 2.0, 2.5, 3, and 4 mg/ml concentrations. To facilitate the solubility of the oils in media, all cultures had a final ethanol concentration of 5% (v/v). Two controls were used, one having the 5% ethanol concentration, and one having just microbes and media. Additionally, all samples and controls were done in triplicates, so $OD_{600}$ values for each time point represents the average of three replicates. To determine how the bio-oils affected microbial growth, the percent change in $OD_{600}$ of the ethanol control during the exponential phase of growth was compared to the growth of the oils at their different concentrations. This resulted in the average percent decrease in growth (degree of inhibition) for each oil at each concentration, with the formula described in Eq. 1:

$$\text{Degree of inhibition}(\%) = \left(1 - \frac{\text{Max}OD_{600} - \text{Min}OD_{600} \text{ of Growth with Oil}}{\text{Max } OD_{600} - \text{Min } OD_{600} \text{ of Ethanol Control}}\right) * 100 \quad (1)$$

Data was reported as the max concertation of each oil to have a degree of inhibition value of ≥90%, which represents little to no growth compared to the control.

Example 3

Results
Mass Balance

TABLE 1

Mass balance of raw CTH products and bio-oil yields from each SEF.

| | Fraction | Average wt % |
|---|---|---|
| Raw CTH Products | Oil | 49.21 ± 1.70 |
| | Solid | 28.84 ± 1.20 |
| | Gas | 21.95 ± 2.90 |

TABLE 1-continued

Mass balance of raw CTH products and
bio-oil yields from each SEF.

|  | Fraction | Average wt % |
|---|---|---|
| Sequential Extraction Oil Yields | Hexane | 25.98 ± 6.62 |
|  | Petroleum Ether | 8.56 ± 2.88 |
|  | Chloroform | 50.70 ± 6.01 |
|  | Ethyl Acetate | 5.81 ± 3.17 |
|  | Water | 8.95 ± 0.31 |

A mass balance was conducted to determine the percentage of bio-oil, unreacted solids, and gas products produced during CTH of the alkali-extracted corn stover lignin (AEL). Table 1 shows the mass percentages of each fraction after CTH, and while the gas fraction was not collected it was estimated by percent difference from the total oil and solid yields. The raw bio-oil yield after CTH of AEL was found to be 49.21±1.70 wt % of starting lignin, the solid yield was 28.84±1.20%, and the gas yield was 21.95±2.90%. While the raw bio-oil yields seen here are higher than Zhou et al.[17] (39.4±3.5%) who used the same hydrogen donor solvent, catalyst, and temperature, because there lignin feedstock was found to have high impurities like sulfur, with an unknown feedstock source and sugar content, it is likely the increased yields are due AEL's high purity. After utilizing precipitation methods for purification, the AEL was found to be 95.11±0.18% lignin and contained only 3.62±0.16% glucan and 1.27±0.03% xylan. Previous work has shown the presence of glucan an xylan can suppress metal catalysts and inhibit lignin depolymerization during CTH[35], thus having low glucan and xylan content in the AEL supports the high yields.

The mass balance for bio-oils in the sequentially extracted fractions (SEF) are shown in Table 1. Chloroform and hexane were found to extract the greatest amount of the raw bio-oil at 50.70±6.01 wt % and 25.98±6.62% respectively. Petroleum ether (8.56±2.88%), ethyl acetate (5.81±3.17%), and the leftover water fraction (8.95±0.31%) extracted considerably less products based on weight. Ren et al.[29] found that hexane and chloroform extracted the same weight percentages of products in pyrolytic bio-oil, and even though they saw a greater number of products extracted from petroleum ether and ethyl acetate they did not perform a sequential extraction. While hexane and petroleum ether have the same polarity[36], sine hexane was used first for extraction it makes sense that less products that have an affinity for non-polar solvents would be available for extraction. Similarly, since chloroform was the first polar solvent used there would be less products left to be extracted by ethyl acetate, even though ethyl acetate has been found to be a superior solvent for lignin bio-oils [29, 37].

Example 4

Molecular Weight Distributions:

TABLE 2

The molecular weight distribution of AEL and lignin
bio-oils derived from CTH and each SEF.

| Source | Mw (g/mol) | Mn (g/mol) | Polydispersity index (PDI) |
|---|---|---|---|
| Corn Stover Lignin (AEL) | 4339.1 | 1391.8 | 3.12 |
| Raw | 761.8 | 465.3 | 1.64 |

TABLE 2-continued

The molecular weight distribution of AEL and lignin
bio-oils derived from CTH and each SEF.

| Source | Mw (g/mol) | Mn (g/mol) | Polydispersity index (PDI) |
|---|---|---|---|
| Hexane | 804.0 | 499.5 | 1.61 |
| Petroleum Ether | 809.4 | 541.8 | 1.49 |
| Chloroform | 876.0 | 566.0 | 1.55 |
| Ethyl Acetate | 916.1 | 580.0 | 1.58 |
| Water | 586.7 | 340.2 | 1.72 |

Figure 2:
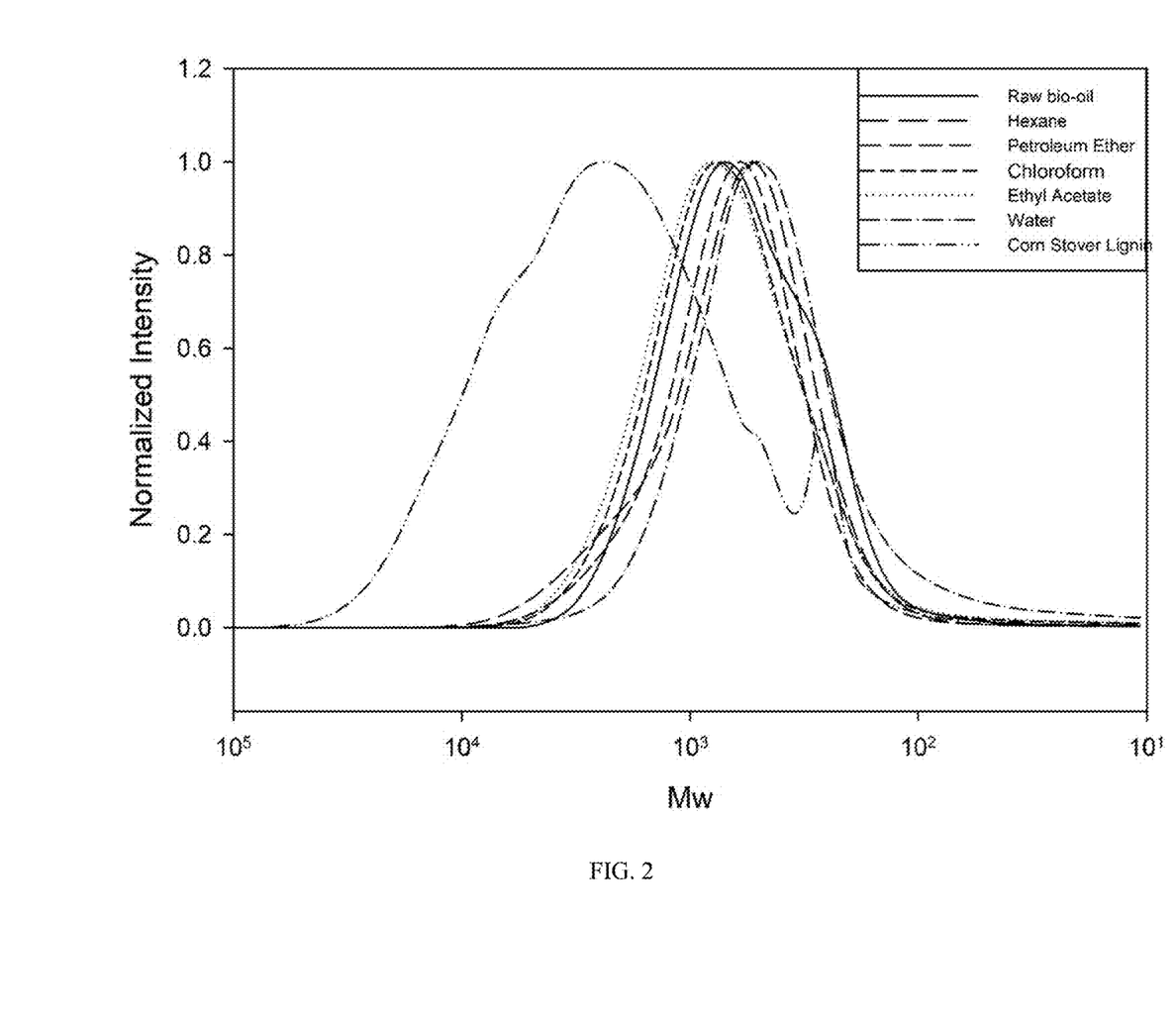
FIG. 2 shows GPC spectra of AEL and lignin bio-oils derived from CTH and each SEF.

Large molecular weight (MW) lignin oligomers are not detectable in GC-MS analysis due to their low volatility. Therefore, changes in molecular weight distributions of lignin after CTH can help gain insight into the degree of depolymerization by examining the weight-average molecular weight (Mw), number-average molecular weight (Mn), and polydispersity index (PDI) of AEL, the raw bio-oil, and the SEFs. FIG. 2 shows the GPC chromatograms of the lignin and bio-oils and Table 2 summarizes the Mw, Mn, and PDI values. Molecular weight distribution (MWD) of all lignin bio-oils after CTH and SEF shifted to the right (i.e. lower MW) compared to the unreacted AEL (FIG. 2). The average Mw of AEL was 4339.1 g/mol; whereas the average Mw of the raw bio-oil after CTH was 761.8 g/mol, which indicates a high degree of depolymerization of the lignin into lower MW compounds. The low Mn of the raw bio-oil at 465.3 g/mol also suggests a large amount of phenolics in the monomeric to trimeric range. When examining the SEF, the Mw gradually increases from hexane to ethyl acetate (804-916.1 g/mol) as polarity increases. This may indicate the more polar solvents have a higher affinity for larger molecular weight phenolics, or that there are less low molecular weight phenolics left to extract, which correlates to the polar solvents extracting the greatest number of compounds based on weight combined. Even though the Mw and Mn of the SEF increase with polarity, the PDI's of the raw and SEF's remain low in the 1.5-1.6 range, suggesting that smaller span of MW compounds with similar MW's are extracted in each fraction. The leftover water fraction had the lowest Mw of 587.7 g/mol and Mn of 340.2 g/mol, which correlate to a higher percentage of low molecular weight compounds like residual sugars that would have a higher affinity and distribution coefficient for water than the other solvents[29]. Additionally, when comparing the SEF to the raw bio-oil, all the SEF have a larger Mw and Mn than the raw bio-oil, possibly indicating repolymerization of the lignin due to drying or the loss of ethanol as a solvent which has been found to act as a capping agent to prevent lignin monomers from repolymerizing[22].

Example 5

GC/MS Characterization of Monomers

TABLE 3

| Fraction | Compound | Yeild (wt %) |
|---|---|---|
| Raw Bio-Oil | Homosyringic acid | 13.12 |
|  | 4-ethyl-phenol | 4.63 |
|  | Syringol | 4.62 |
|  | Methyl 4-hydroxyhydrocinnamate | 3.04 |
|  | 4-ethylguaiacol | 2.14 |
|  | Ethyl-β-(4-hydroxy-3-methoxy-phenyl)-propionate | 0.78 |

TABLE 3-continued

| Fraction | Compound | Yield (wt %) |
|---|---|---|
| | 5-tert-Butylpyrogallol | 0.66 |
| | Creosol | 0.61 |
| | 4-methoxy-3-(methoxymethyl)-phenol | 0.57 |
| | p-Cresol | 0.31 |
| | 2,5-Diethylphenol | 0.28 |
| | 1-Propanone, 1-(2,4-dimethoxyphenyl)- | 0.22 |
| | Guaicol | 0.22 |
| | Acetosyringone | 0.21 |
| | 4-propyl-phenol | 0.18 |
| | Homovanillyl alcohol | 0.17 |
| | 4-Allylsyringol | 0.16 |
| | Eugenol | 0.14 |
| | Homovanillyl alcohol | 0.13 |
| | Phenol | 0.12 |
| | Ethyl homovanillate | 0.11 |
| | Total | 32.44 |
| Hexane | Homosyringic acid | 26.77 |
| | 4-propylguaiacol | 3.93 |
| | 4-ethyl-phenol | 1.36 |
| | 5-tert-Butylpyrogallol | 1.29 |
| | Ethyl-β-(4-hydroxy-3-methoxy-phenyl)-propionate | 0.87 |
| | 4-ethylguaiacol | 0.63 |
| | 2,5-Dimethoxybenzyl alcohol | 0.57 |
| | Methyl 4-hydroxyhydrocinnamate | 0.39 |
| | 2,5-Diethylphenol | 0.27 |
| | 4-((1E)-3-Hydroxy-1-propenyl)-2-methoxyphenol | 0.15 |
| | 1-Propanone, 1-(2,4-dimethoxyphenyl)- | 0.13 |
| | 4-propyl-phenol | 0.10 |
| | Syringol | 0.06 |
| | 3-(1,1-dimethylethyl)-4-methoxy-phenol | 0.05 |
| | Total | 24.65 |
| Petroleum Ether | Homosyringic acid | 16.57 |
| | Methyl 4-hydroxyhydrocinnamate | 2.43 |
| | Ethyl-β-(4-hydroxy-3-methoxy-phenyl)-propionate | 1.91 |
| | 5-tert-Butylpyrogallol | 0.81 |
| | 2-methyl-5-(1-methylethyl)-phenol | 0.49 |
| | Homovanillyl alcohol | 0.45 |
| | 3-ethoxy-2-hydroxy-benzaldehyde | 0.31 |
| | 1,2,4-Trimethoxybenzene | 0.31 |
| | 3,4,5-Trimethoxyphenylacetic acid | 0.23 |
| | Acetosyringone | 0.23 |
| | Ethyl homovanillate | 0.22 |
| | 4-propylguaiacol | 0.22 |
| | 4-Allylsyringol | 0.19 |
| | 3-(3-Methoxyphenyl)propionic acid ethyl ester | 0.12 |
| | 4-ethyl-phenol | 0.06 |
| | 4-propylguaiacol | 0.06 |
| | Syringol | 0.02 |
| | 4-Ethylguaiacol | 0.01 |
| | 4-propyl-phenol | 0.01 |
| | 4-butyl-phenol | 0.01 |
| | 2-ethyl-4,5-dimethyl-phenol | 0.01 |
| | Total | 24.65 |
| Chloroform | Ethyl homovanillate | 4.68 |
| | Homovanillyl alcohol | 4.34 |
| | Acetosyringone | 0.80 |
| | Dihydromethyleugenol | 0.59 |
| | 4-ethyl-phenol | 0.58 |
| | (3,4-Dimethoxyphenyl)-methoxymethanol | 0.53 |
| | Syringol | 0.47 |
| | 1,2,4-Trimethoxybenzene | 0.40 |
| | 4-Allylsyringol | 0.28 |
| | 5-tert-Butylpyrogallol | 0.24 |
| | Benzeneacetic acid, 4-hydroxy-, ethyl ester | 0.17 |
| | Ethyl-β-(4-hydroxy-3-methoxy-phenyl)-propionate | 0.11 |
| | 3-hydroxy-4-methoxy-benzaldehyde | 0.10 |
| | 3,4-Diethoxyphenylacetic acid | 0.10 |
| | 3,4,5-Trimethoxyphenylacetic acid | 0.09 |
| | 3,5-Dimethoxy-4-hydroxyphenylacetic acid (homosyringic acid) | 0.08 |
| | Methyl (3,4-dimethoxyphenyl)(hydroxy)acetate | 0.08 |
| | Apocynin | 0.08 |
| | 3-ethoxy-2-hydroxy-benzaldehyde | 0.07 |
| | 5-methoxy-2,3-dimethyl-phenol | 0.07 |
| | 4-hydroxy-3-methoxy-Phenylacetylformic acid | 0.07 |
| | Methyl-(2-hydroxy-3-ethoxy-benzyl) ether | 0.07 |
| | 4-Ethylguaiacol | 0.06 |
| | Dihydroeugenol | 0.05 |
| | p-Cresol | 0.04 |
| | Methyl 4-hydroxyhydrocinnamate | 0.03 |
| | 1-(4-hydroxy-3-methoxyphenyl)-2-Propanone | 0.02 |
| | 3-Methoxy-5-methylphenol | 0.02 |
| | 3-Methylguaiacol | 0.01 |
| | 2-propyl-phenol | 0.01 |
| | Total | 14.24 |
| Ethyl Acetate | Methyl 4-hydroxyhydrocinnamate | 1.78 |
| | Homovanillyl alcohol | 0.52 |
| | Homosyringic acid | 0.50 |
| | Acetosyringone | 0.36 |
| | β-(4-Hydroxy-3-methoxyphenyl) propionic acid | 0.30 |
| | (3,4-Dimethoxyphenyl)-methoxymethanol | 0.27 |
| | 3,5-Dimethoxy-4-hydroxyphenylacetic acid | 0.22 |
| | Ethyl-β-(4-hydroxy-3-methoxy-phenyl)-propionate | 0.15 |
| | 1,2-Dimethoxy-4-n-propylbenzene | 0.14 |
| | Dihydroeugenol | 0.09 |
| | 1,2,4-Trimethoxybenzene | 0.08 |
| | Vanillin | 0.08 |
| | 5-tert-Butylpyrogallol | 0.07 |
| | Homovanillyl alcohol | 0.07 |
| | 4-Allylsyringol | 0.06 |
| | Apocynin | 0.05 |
| | 4-ethyl-phenol | 0.05 |
| | 3-(p-Hydroxyphenyl)-1-propanol | 0.05 |
| | Syringol | 0.05 |
| | Ethyl homovanillate | 0.04 |
| | Homovanillic acid | 0.03 |
| | Phenyl Vinyl Ether | 0.02 |
| | l-(4-hydroxy-3-methoxyphenyl)-2-Propanone | 0.02 |
| | 4-Ethylguaiacol | 0.02 |
| | Tyrosol | 0.01 |
| | 1-ethoxy-2-methoxy-4-methylbenzene | 0.01 |
| | Total | 5.04 |
| Water | β-(4-Hydroxy-3-methoxyphenyl) propionic acid | 0.35 |
| | Methyl 4-hydroxyhydrocinnamate | 0.20 |
| | Tyrosol | 0.18 |
| | Homovanillyl alcohol | 0.08 |
| | Total | 0.81 |

Figure 3:
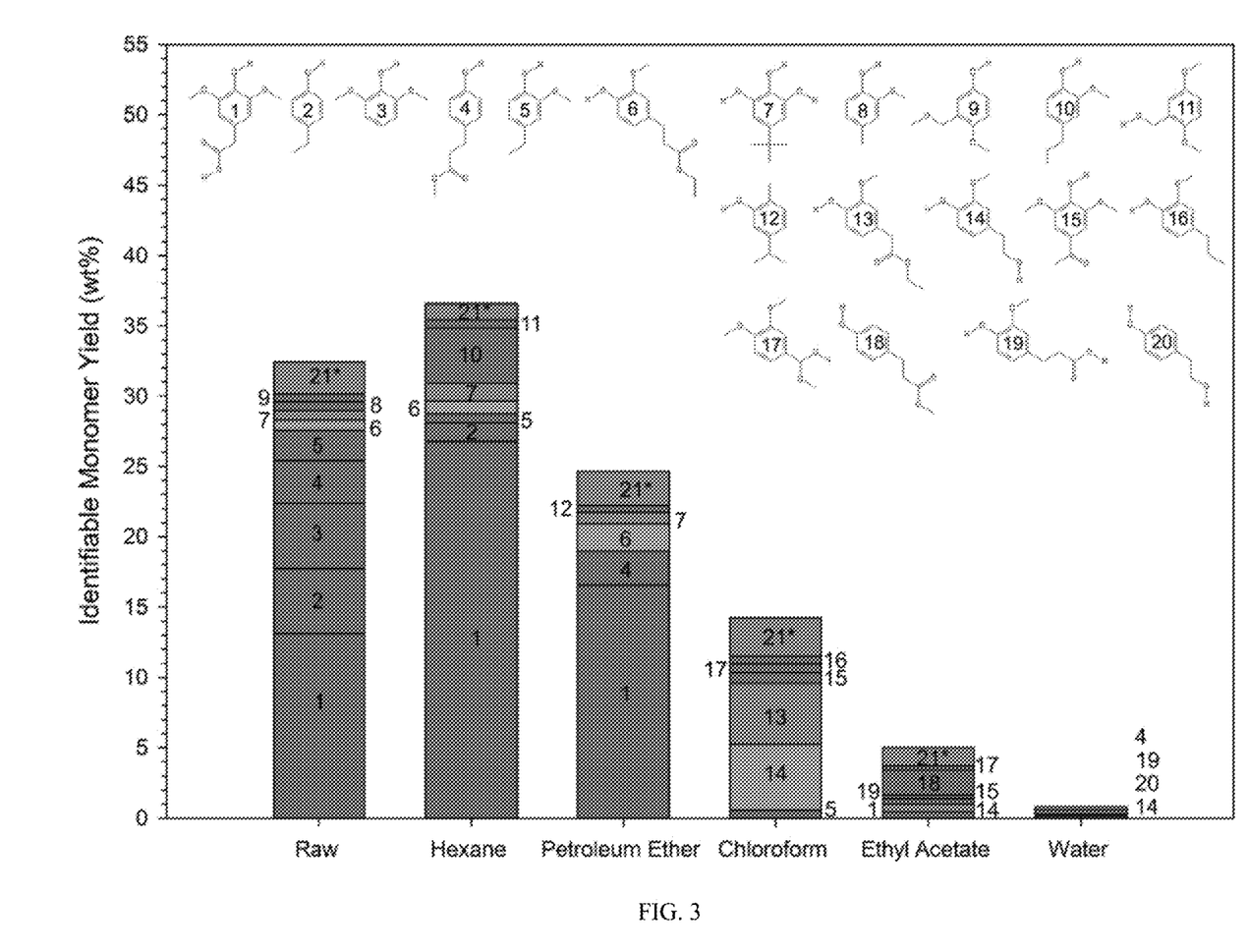
FIG. 3 shows a GC/MS identifiable monomers for raw bio-oil and SEF, with total wt % of monomers in each oil (only monomers representing ≥0.5 wt % were included unless the total weight of other compounds was greater than 50% of total monomers).

The GC/MS analysis for the raw and SEF bio-oils are summarized in FIG. 3, which shows compounds that were greater than 0.5% of total oil weight, and Table 3. In general, all oils contained low amounts of detectable monomers, with the raw bio-oil (32.44 wt %) and hexane fraction (36.57 wt %) having the highest percentages of monomers in terms of total oil weight. This implies that bio-oil derived from CTH of AEL is mostly comprised of nonvolatile large molecules, as evidenced by the GPC results shown in Table 2. When examining the raw bio-oil, hydroxycinnamic acid derivatives such as homosyringic acid (13.12 wt %), methyl-4-hydroxyhydrocinnamate (3.04 wt %), and Ethyl-β-(4-hydroxy-3-methoxy-phenyl)-propionate (0.78 wt %) comprise most of the detectable monomers. Hydroxycinnamic acids (i.e. ferulic and synapic acid) are primarily bound through ester bonds in lignin and during CTH they are liberated by transesterification with ethanol[39]. Additionally, hydroxycinnamic acids like methyl ferulae can be incorporated in lignin through ether, ester, or C—C, linkages so they can also be liberated by β-O-4 cleavage[39, 40]. After the hydroxycinnamic acids are liberated during CTH they can be hydrogenated to remove the double bond in the α,β positions of the side chain, which would produce the hydroxycinnamic acid derivates identified in the raw bio-oil.

Other major monomers found in the raw bio-oil were phenolics with alkane substitutes (i.e. 4-ethyl-phenol, 4-ethylguaiacol, creosol etc.) that can be ascribed to the reductive cleavage of α-O-4 and β-O-4 linkages, and cleavage of $C_\alpha/C_\beta$ or $C_\beta/C_\gamma$ bonds during CTH[20, 21, 41]. The large presence of methoxylated phenols like syringol, guaiacol, and vanillin derivatives indicates a lack of decarboxylation occurring, which is seen more often in reducing atmospheres (hydrogen) compared to the inert (nitrogen) atmosphere used in this study[21]. While other works have identified phenolics that maintained the C—C double bond in the α, β, or γ positions[39, 42], only two compounds were identified (2,6-dimethoxy-4-(2-propenyl)-phenol and eugenol) that combined only accounted for 0.3% of total bio-oil weight (Table 3). Because unsaturated C—C double bonds on side chain are highly reactive, promote lignin repolymerization, and prone to hydrogenation[43], the lack of these compounds can be understood. Many of the same compounds found in the raw bio-oil were found in the SEFs, but because the SEFs concentrated specific fractions of the raw bio-oil there were many new compounds found that were at too low of a concentration to be detected in the raw bio-oil.

The SEFs had decreasing extraction efficiency of identifiable monomers with increasing polarity and order of extraction with the following values: hexane 36.57 wt %, petroleum ether 24.65%, chloroform 14.24%, ethyl acetate 5.04%, and water retaining 0.81% (FIG. 3). While it is surprising that chloroform had such a low wt % of identifiable monomers despite extracting over 50 wt % of the total raw bio-oil and having 30 identifiable monomers, since chloroform was the third solvent used during sequential extraction there may not have simply been enough monomers at high concentrations to extract. This is further supported by the fact that most of the chloroforms extracted monomers were vanillin derivatives (i.e. ethyl homovanillate and homovanillyl alcohol), which were found to account for less than 0.5% of total raw bio-oil weight (Table 3). This is similar to the results shown for ethyl acetate, and even though other works have shown chloroform and ethyl acetate have the greatest total extraction efficiency of phenolics in bio-oil the use of sequential extraction here limits the concentration of compounds after each step[29, 30, 44].

Furthermore, hexane and petroleum ether have very low polarity that limits dispersion of oxygenated compounds during extraction, but the present invention shows oxygenated compounds like homosyringic acid account for 26.77% and 16.57% of hexane and petroleum ethers total oil weight, respectively. Other works have found despite hexane and petroleum ether's low polarity they still have relativity high extraction efficiency for phenolics that are oxygenated, including guaiacol, 2-6-dimethoxyphenol, and creosol ranging from 36-80 wt % of pyrolytic oil in aqueous phase[29]. Coupled with the fact that homosyringic acid and other highly oxygenated phenolics accounted for the highest wt % of the raw bio-oil, it makes sense that due to there high concentrations hexane and petroleum ether would have high extraction efficiency despite their low polarity. Although some phenolic compounds (i.e. syringol and guaiacol) can have a high distribution coefficient in water[45], the use of sequential extraction severely limited the presence of identifiable phenolics in the water fraction.

The leftover water fraction had four identifiable monomers that accounted for only 0.81 wt % of its weight (FIG. 3), which means that sequential liquid-liquid extraction can effectively remove almost all the bio-oil in the aqueous phase. While the data is not reported here, many peaks were identified and associated with sugar derivatives (i.e. glucose, xylose, mannose etc.) in the water fraction, confirming the previous ascertain that the low molecular weight compounds in the water fraction found by GPC are from the residual sugars in AEL. Additionally, in the raw bio-oil and sequential extraction fractions many peaks were identified and associated with ethyl esters with carboxylic acids ($C_6$-$C_{21}$), e.g. hexanoic acid, heptadecanoic acid, nonanoic acid, and docosanoic acid. These esters might be generated by esterification between ethanol and some lignin-derived intermediates, as similarly observed in other works with CTH of lignin[16, 21, 46]. While the compounds were not quantified or reported, the total relative peak area percentage of the compounds for each oil is as follows: raw bio-oil 3.14%, hexane 2%, petroleum ether 9%, chloroform 25%, ethyl acetate 29%, and water fraction 17%. This suggests that the more polar solvents had greater extraction efficiency for the esters, or that they were less saturated with available monomers which increased their extraction efficiency of the larger esters. This is further supported by the GPC results (Table 2) that reported higher Mw values for the more polar solvents. Therefore, the data suggests total identifiable monomer extraction did not correlate to solvent polarity but to the order of extraction, even though there was some selectivity based on polarity.

Example 6

Antimicrobial Activity

Figure 4:
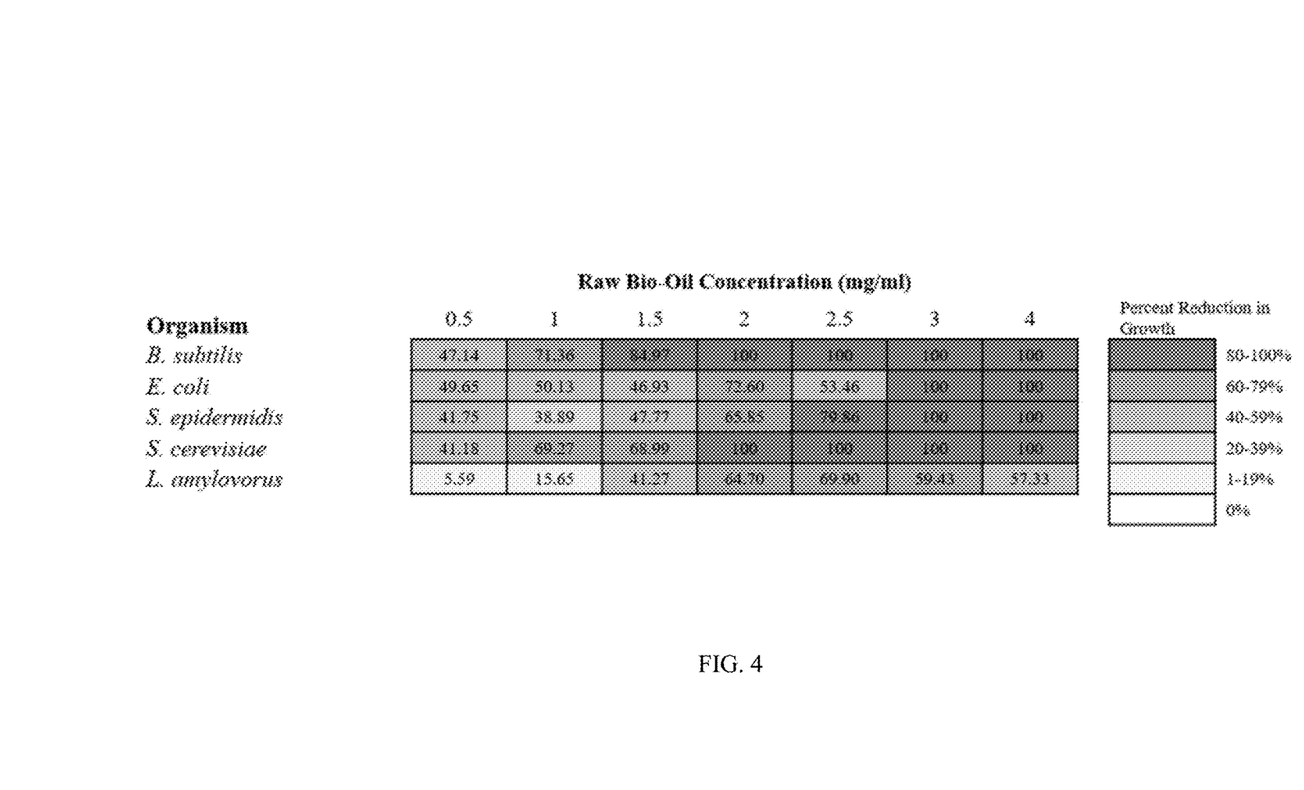
FIG. 4 shows a heat map showing the degree of inhibition on all microorganisms tested against different concentrations of raw bio-oil (inhibition values represent the percent decrease in growth compared to control).
Figure 5:
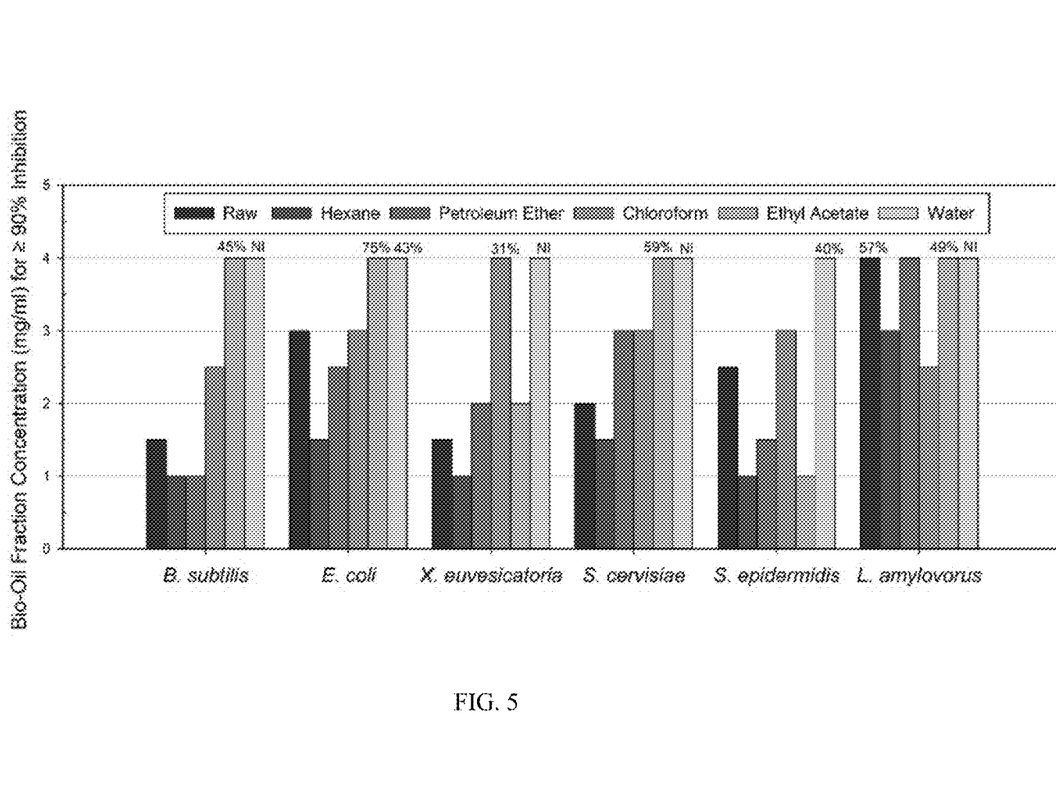
FIG. 5 shows a Raw bio-oil and SEF concentrations causing greater than 90% inhibition compared to the control (NI=no inhibition, and percent values are degree of inhibition at highest concentration tested).

The raw bio-oil and SEFs were tested for antimicrobial properties against Gram-positive bacteria (*Bacillus subtilis, Lactobacillus amylovorus,* and *Staphylococcus epidermidis*), Gram-negative bacteria (*Escherichia coli*), and yeast (*Saccharomyces cerevisiae*) by examining differences in growth measured by spectrophotometry. These organisms where chosen because they are important contamination or model organisms involved in the use of antimicrobials in biorefineries (*L. amylovorus* and *S. cerevisiae*), medical (*S. epidermidis*) and food (*B. subtilis*) environments[47-49]. FIG. 4 shows a heat map of the degree of inhibition of the raw bio-oil against all organisms, and FIG. 5 summarizes the raw bio-oil and SEF's antimicrobial activity by illustrating the concentrations of oil that inhibited microbial growth by ≥90%. The raw bio-oil was effective at inhibiting all microbes at concentrations ≥3 mg/ml besides for the *lactobacillus* species. *L. amylovorus* did show ~69% reduction of growth at 2-2.5 mg/ml, but at higher concentrations there was only around a ~57% reduction in growth (FIG. 4). The authors did notice a slight emulsion being formed at the higher concentration in the MRS broth used to culture the *lactobacillus*, which could indicate an issue with solubility of the raw bio-oil thus limiting its antimicrobial properties. Nonetheless, the raw bio-oil was very effective at inhibiting the other microorganisms and even showed increased inhibition against the yeast and other Gram-positive bacteria (*B. subtilis* and *S. epidermidis*) at lower concentrations compared to the Gram-negative bacteria (*E. coli*). This is consistent with other work utilizing plant extracts and wood vinegars with high phenolic content, that determined Gram-positive bacteria are more susceptible to phenolics due to the absence of an outer membrane of lipoprotein and lipopolysaccharides that regulate access of antimicrobials into the underlying cell structure[50]. Based on the GC/MS data, the raw bio-oil at concentrations of 3 mg/ml would contain ~0.9 mg/ml of monomeric phenolics, and since other work with wood vinegars have shown phenolic content as low as 0.06-0.32 mg/ml show inhibition of Gram-positives and fungi[51], they are regarded here as the major antimicrobial constituents in the raw bio-oil. Compared to the raw bio-oil the SEFs showed maximum antimicrobial properties at different concentrations.

In general, the SEFs show a decrease in antimicrobial content with a decrease in total identifiable monomers. For example, hexane has the highest percentage of monomers (36.57 wt %) compared to all other SEF and it shows inhibition at lower concentrations against all tested organisms compared to the other fractions (FIG. 5). While chloroform and ethyl acetate show inhibition at lower concentrations than hexane against *L. amylovorous* and *S. epidermidis*, respectively, the general trend of total monomers increasing antimicrobial properties still exists for the other fractions and organisms. Ethyl acetate only showed a ≥90% reduction in S. epidermidis growth while the other organisms experienced less inhibition with reduction values ranging from 25%-55% at the highest tested concentration of 4 mg/ml. This may suggest an unknown species-specific inhibition occurring from undetected oligomers/compounds. The water fraction showed no inhibition at 4 mg/ml against *B. subtilis*, *S. cerviseiae*, and *L. amylovorous*, but did have a 57% reduction in growth for *E. coli* and 60% for *S. epidermidis*. The loss of antimicrobial activity for the water fraction in most of the organisms could be due to its extremely low monomer content (0.81%) and presence of residual sugars, but its growth effects on *E. coli* and *S. epidermidis* could also be due to unidentified oligomers/compounds.

For example, when comparing the raw bio-oil with the hexane and petroleum ether fractions there is a direct correlation to homosyringic acid content and antimicrobial activity against the bacteria. Hexane has a homosyringic acid content of 26.77 wt % of oil, petroleum ether 16.57%, and the raw bio-oil 13.12% (FIG. 3), so homosyringic acid content is in the following order: hexane>petroleum ether>raw bio-oil. Against each bacterium, the minimum oil concentration causing ≥90% reduction in growth is lowest in hexane and highest in the raw bio-oil, which follows the same trend as homosyringic acid content. While no known work as directly tested homosyringic acid for antimicrobial properties it is a derivative of syringol-type lignin that has had other derivatives (i.e. syringol, 4-methylsyringol and syringaldehyde) confirmed for antibacterial and antifungal properties[51]. Thus, homosyringic acid could be the main antibacterial agent in the raw bio-oil, hexane, and petroleum ether fractions. Although the yeast did not follow the same trend as the bacteria for homosyringic acid content, the raw bio-oil, hexane and petroleum ether fractions still had significant antimicrobial properties against the yeast at concentrations less than 3 mg/ml. The antimicrobial properties against yeast can still be attributed to lignin monomers as the guaiacol-type monomers and phenolics with short alkyl chains (i.e. 4-ethylphenol, 4-methylguaicol and 4-ethylguaicol) that comprise the bio-oils also have confirmed antimicrobial properties[51-53]. Moreover, the chloroform fraction did not contain a large concentration of homosyringic acid, but it did contain ~10% of vanillin derivatives, such as ethyl homovanillate and homovanillyl alcohol (FIG. 3, Table 3). Vanillin is known for its antimicrobial properties against bacteria, fungi, and yeast as a food preservative at concentrations ranging from 0.76 mg/ml for yeast and 1.5 mg/ml for bacteria[54, 55]. Therefore, the high presence of vanillin derivatives in the chloroform fraction may have a direct correlation to its antimicrobial properties against all tested organisms, but since there were 30 identifiable monomers in chloroform that only accounted for 14.24 wt % of oil there may still be unidentifiable oligomers/compounds causing antibacterial activity. Additionally, because each bio-oil has been shown to be a complex and diverse cocktail of monomers with unknown compounds (based on weight differences), there may be unknown and unquantifiable reactions occurring with the microorganisms that drive the antimicrobial activity seen here. In summary, the data suggest total monomer concentration and the presence of specific monomers (i.e. homosyringic acid and vanillin) has correlations to antimicrobial activity, but the exact mode of action or antimicrobial activity of unidentified oligomers/compounds remains unclear.

Purified alkali-extracted corn stover lignin (AEL) was successfully depolymerized by catalytic transfer hydrogenolysis using supercritical ethanol and a Ru/C catalyst. The resulting bio-oil was produced with high yields (49.21 wt %) and sequentially extracted in the aqueous phase using nonpolar and polar solvents in the following order: hexane, petroleum ether, chloroform, ethyl acetate. The solvents and leftover water fraction had the following order of oil extraction yields ranging from 50.7-5.8 wt % of total bio-oil: chloroform>hexane>petroleum ether≈water>ethyl acetate. Extraction efficiency followed the trend that the first solvent used in each change in polarity during sequential extraction had the highest percentage of products extracted. Molecular weights of the raw bio-oil and sequential extraction fractions (SEF) were lower than the unreacted AEL, demonstrating depolymerization of AEL into lower molecular weight products. GC/MS analysis showed the presence of hydrogenated hydroxycinnamic acid derivatives, syringol and guaiacol-type lignans, and alkylated phenols, with a raw bio-oil having a total monomeric content of 32.44 wt % of total oil and the SEFs having a monomeric content of 36.57-0.81 wt % decreasing in order of extraction. The antimicrobial activity data suggest total monomer concentration and the presence of specific monomers (i.e. homosyringic acid and vanillin) has correlations to antimicrobial activity, but the exact mode of action or antimicrobial activity caused by the complex mixtures of monomers and unidentified oligomers/compounds remains unclear. Therefore, study provides insights into the types of lignin derived compounds that confer antimicrobial activity and that compounds can be preferentially extracted from lignin bio-oil using a simple liquid to liquid extraction method.

All publications, patents, and patent applications mentioned in this specification are herein incorporated by reference to the same extent as if each individual publication, patent, or patent application was specifically and individually indicated to be incorporated by reference, including the references set forth in the following list:

REFERENCES

Each of the following references is herein incorporated by reference in its entirety.

1. Shen, R., Tao, L., and Yang, B. (2018) Techno-economic analysis of jet-fuel production from biorefinery waste lignin, *Biofuels, Bioproducts and Biorefining* 0.
2. Mandal, S. M., Dias, R. O., and Franco, O. L. (2017) Phenolic Compounds in Antimicrobial Therapy, *Journal of Medicinal Food* 20, 1031-1038.

3. Calvo-Flores, F. G., Dobado, J. A., Isac-García, J., and Martin-Martínez, F. J. (2015) Applications of Modified and Unmodified Lignins, In *Lignin and Lignans as Renewable Raw Materials*, pp 247-288, John Wiley & Sons, Ltd.
4. Telysheva, G., Dizhbite, T., Lebedeva, G., and Niokolaeva, V. (2005) Lignin products for decontamination of environment objects from pathogenic microorganisms and pollutants, *Proceedings of the 7th ILI Forum, Barcelona, Spain*, 71-74.
5. Cazacu, G., Capraru, M., and Popa, V. I. (2013) Advances Concerning Lignin Utilization in New Materials, In *Advances in Natural Polymers*, pp 255-312, Springer, Berlin, Heidelberg.
6. Bakker, E. P. (1979) Ionophore Antibiotics, In *Mechanism of Action of Antibacterial Agents*, pp 67-97, Springer, Berlin, Heidelberg.
7. Russell, J. B., and Houlihan, A. J. (2003) Ionophore resistance of ruminal bacteria and its potential impact on human health, *FEMS Microbiol. Rev.* 27, 65-74.
8. Espinoza-Acosta, J. L., Tones-Chávez, P. I., Ramírez-Wong, B., López-Saiz, C. M., and Montaño-Leyva, B. (2016) Antioxidant, antimicrobial, and antimutagenic properties of technical lignins and their applications, *BioResources* 11, 5452-5481.
9. Zemek, J., Košiková, B., Augustín, J., and Joniak, D. (1979) Antibiotic properties of lignin components, *Folia Microbiol* 24, 483-486.
10. Pandey, M. P., and Kim, C. S. (2011) Lignin Depolymerization and Conversion: A Review of Thermochemical Methods, *Chemical Engineering & Technology* 34, 29-41.
11. Sun, Z., Fridrich, B., de Santi, A., Elangovan, S., and Barta, K. (2018) Bright Side of Lignin Depolymerization: Toward New Platform Chemicals, *Chemical Reviews* 118, 614-678.
12. Kawamoto, H. (2017) Lignin pyrolysis reactions, *Journal of Wood Science* 63, 117-132.
13. Riaz, A., Kim, C. S., Kim, Y., and Kim, J. (2016) High-yield and high-calorific bio-oil production from concentrated sulfuric acid hydrolysis lignin in supercritical ethanol, *Fuel* 172, 238-247.
14. Lee, H. S., Jae, J., Ha, J. M., and Suh, D. J. (2016) Hydro- and solvothermolysis of kraft lignin for maximizing production of monomeric aromatic chemicals, *Biresour Technol* 203, 142-149.
15. Zaheer, M., and Kempe, R. (2015) Catalytic Hydrogenolysis of Aryl Ethers: A Key Step in Lignin Valorization to Valuable Chemicals, *ACS Catalysis* 5, 1675-1684.
16. Das, L., Li, M., Stevens, J., Li, W., Pu, Y., Ragauskas, A. J., and Shi, J. (2018) Characterization and Catalytic Transfer Hydrogenolysis of Deep Eutectic Solvent Extracted Sorghum Lignin to Phenolic Compounds, *ACS Sustainable Chemistry & Engineering* 6, 10408-10420.
17. Zhou, M., Sharma, B. K., Liu, P., Ye, J., Xu, J., and Jiang, J.-C. (2018) Catalytic in Situ Hydrogenolysis of Lignin in Supercritical Ethanol: Effect of Phenol, Catalysts, and Reaction Temperature, *ACS Sustainable Chemistry & Engineering* 6, 6867-6875.
18. Xu, C., Arancon, R. A. D., Labidi, J., and Luque, R. (2014) Lignin depolymerisation strategies: towards valuable chemicals and fuels, *Chemical Society Reviews* 43, 7485-7500.
19. Barta, K., Matson, T. D., Fettig, M. L., Scott, S. L., Iretskii, A. V., and Ford, P. C. (2010) Catalytic disassembly of an organosolv lignin via hydrogen transfer from supercritical methanol, *Green Chemistry* 12, 1640-1647.
20. Zhang, J. (2018) Catalytic transfer hydrogenolysis as an efficient route in cleavage of lignin and model compounds, *Green Energy & Environment* 3, 328-334.
21. Cheng, S., Wilks, C., Yuan, Z., Leitch, M., and Xu, C. (2012) Hydrothermal degradation of alkali lignin to biophenolic compounds in sub/supercritical ethanol and water-ethanol co-solvent, *Polymer Degradation and Stability* 97, 839-848.
22. Huang, X., Korányi, T. I., Boot, M. D., and Hensen, E. J. M. (2015) Ethanol as capping agent and formaldehyde scavenger for efficient depolymerization of lignin to aromatics, *Green Chemistry* 17, 4941-4950.
23. Matsumoto, M., Inomoto, Y., and Kondo, K. (2005) Selective separation of aromatic hydrocarbons through supported liquid membranes based on ionic liquids, *Journal of Membrane Science* 246, 77-81.
24. Aghazadeh, M., and Engelberth, A. S. (2016) Technoeconomic analysis for incorporating a liquid-liquid extraction system to remove acetic acid into a proposed commercial scale biorefinery, *Biotechnology progress* 32, 971-977.
25. Miyamoto, K., Hara, T., Kobayashi, H., Morisaka, H., Tokuda, D., Horie, K., Koduki, K., Makino, S., Núñez, O., Yang, C., Kawabe, T., Ikegami, T., Takubo, H., Ishihama, Y., and Tanaka, N. (2008) High-Efficiency Liquid Chromatographic Separation Utilizing Long Monolithic Silica Capillary Columns, *Analytical Chemistry* 80, 8741-8750.
26. Fele ilnik, L., and Jazbinšek, A. (2012) Recovery of renewable phenolic fraction from pyrolysis oil, *Separation and Purification Technology* 86, 157-170.
27. Mahfud, F. H., van Geel, F. P., Venderbosch, R. H., and Heeres, H. J. (2008) Acetic Acid Recovery from Fast Pyrolysis Oil. An Exploratory Study on Liquid-Liquid Reactive Extraction using Aliphatic Tertiary Amines, *Separation Science and Technology* 43, 3056-3074.
28. Zeng, F., Liu, W., Jiang, H., Yu, H.-Q., Zeng, R. J., and Guo, Q. (2011) Separation of phthalate esters from bio-oil derived from rice husk by a basification-acidification process and column chromatography, *Bioresource Technology* 102, 1982-1987.
29. Ren, S., Ye, X. P., and Borole, A. P. (2017) Separation of chemical groups from bio-oil water-extract via sequential organic solvent extraction, *Journal of Analytical and Applied Pyrolysis* 123, 30-39.
30. Wei, Y., Lei, H., Wang, L., Zhu, L., Zhang, X., Liu, Y., Chen, S., and Ahring, B. (2014) Liquid-Liquid Extraction of Biomass Pyrolysis Bio-oil, *Energy & Fuels* 28, 1207-1212.
31. Katahira, R., Mittal, A., McKinney, K., Chen, X., Tucker, M. P., Johnson, D. K., and Beckham, G. T. (2016) Base-Catalyzed Depolymerization of Biorefinery Lignins, *ACS Sustainable Chemistry & Engineering* 4, 1474-1486.
32. He, Y., Li, X., Ben, H., Xue, X., and Yang, B. (2017) Lipid Production from Dilute Alkali Corn Stover Lignin by Rhodococcus Strains, *ACS Sustainable Chemistry & Engineering* 5, 2302-2311.
33. Selig, M., Weiss, N., and Ji, Y. (2008) *Enzymatic saccharification of lignocellulosic biomass. NREL Laboratory Analytical Procedure*, Technical Report NREL/TP-510-42629, NREL, Colo., USA. http://www.nrel.gov/docs/gen/fy08/42629.pdf.
34. McClelland, D. J., Motagamwala, A. H., Li, Y., Rover, M. R., Wittrig, A. M., Wu, C., Buchanan, J. S., Brown, R. C., Ralph, J., and Dumesic, J. A. (2017) Functionality and molecular weight distribution of red oak lignin before and after pyrolysis and hydrogenation, *Green Chemistry* 19, 1378-1389.

35. Wang, H., Duan, Y., Zhang, Q., and Yang, B. (2018) Effects of Sugars, Furans, and their Derivatives on Hydrodeoxygenation of Biorefinery Lignin-Rich Wastes to Hydrocarbons, *ChemSusChem* 11, 2562-2568.
36. Miller. (1998) Solvent Polarity Table, Miller's Homke.
37. Ma, R., Guo, M., Lin, K.-t., Hebert, V. R., Zhang, J., Wolcott, M. P., Quintero, M., Ramasamy, K. K., Chen, X., and Zhang, X. (2016) Peracetic Acid Depolymerization of Biorefinery Lignin for Production of Selective Monomeric Phenolic Compounds, *Chemistry—A European Journal* 22, 10884-10891.
38. Dodge, L. A. (2018) Fractionation of Lignin Derived Compounds from Thermochemically Processed Lignin Towards Antimicrobial Properties, *In Theses and Dissertations—Biosystems and Agricultural Engineering*.
39. Anderson, E. M., Katahira, R., Reed, M., Resch, M. G., Karp, E. M., Beckham, G. T., and Román-Leshkov, Y. (2016) Reductive Catalytic Fractionation of Corn Stover Lignin, *ACS Sustainable Chemistry & Engineering* 4, 6940-6950.
40. Ralph, J., Bunzel, M., Marita, J. M., Hatfield, R. D., Lu, F., Kim, H., Schatz, P. F., Grabber, J. H., and Steinhart, H. (2004) Peroxidase-dependent cross-linking reactions of p-hydroxycinnamates in plant cell walls, *Phytochemistry Reviews* 3, 79-96.
41. Song, Q., Wang, F., Cai, J., Wang, Y., Zhang, J., Yu, W., and Xu, J. (2013) Lignin depolymerization (LDP) in alcohol over nickel-based catalysts via a fragmentation-hydrogenolysis process, *Energy & Environmental Science* 6, 994-1007.
42. Klein, I., Saha, B., and Abu-Omar, M. M. (2015) Lignin depolymerization over Ni/C catalyst in methanol, a continuation: effect of substrate and catalyst loading, *Catalysis Science & Technology* 5, 3242-3245.
43. Huang, X., Korányi, T. I., Boot, M. D., and Hensen, E. J. M. (2014) Catalytic Depolymerization of Lignin in Supercritical Ethanol, *ChemSusChem* 7, 2276-2288.
44. Tian, Q. K., He, L., Zhang, H., Lv, Z. L., and Li, R. (2011) Study on Solvent Extraction of Fast Pyrolysis Bio-Oil, *Advanced Materials Research* 306-307, 1532-1536.
45. Vitasari, C. R., Meindersma, G. W., and de Haan, A. B. (2011) Water extraction of pyrolysis oil: The first step for the recovery of renewable chemicals, *Bioresource Technology* 102, 7204-7210.
46. Tang, Z., Zhang, Y., and Guo, Q. (2010) Catalytic Hydrocracking of Pyrolytic Lignin to Liquid Fuel in Supercritical Ethanol, *Industrial & Engineering Chemistry Research* 49, 2040-2046.
47. Setlow, P. (2006) Spores of *Bacillus subtilis*: their resistance to and killing by radiation, heat and chemicals, *Journal of Applied Microbiology* 101, 514-525.
48. O'gara, J. P., and Humphreys, H. (2001) *Staphylococcus epidermidis* biofilms: importance and implications, *Journal of medical microbiology* 50, 582-587.
49. M Bischoff, K., Liu, S., D Leathers, T., Worthington, R., and O Rich, J. (2009) *Modeling Bacterial Contamination of Fuel Ethanol Fermentation*.
50. Yang, J. F., Yang, C. H., Liang, M. T., Gao, Z. J., Wu, Y. W., and Chuang, L. Y. (2016) Chemical Composition, Antioxidant, and Antibacterial Activity of Wood Vinegar from Litchi chinensis, *Molecules* (Basel, Switzerland) 21.
51. Hwang, Y. H., Matsushita, Y. I., Sugamoto, K., and Matsui, T. (2005) *Antimicrobial effect of the wood vinegar from Cryptomeria japonica sapwood on plant pathogenic microorganisms*.
52. de Souza Araujo, E., Pimenta, A. S., Feijo, F. M. C., Castro, R. V. O., Fasciotti, M., Monteiro, T. V. C., and de Lima, K. M. G. (2018) Antibacterial and antifungal activities of pyroligneous acid from wood of *Eucalyptus urograndis* and *Mimosa tenuiflora*, *J Appl Microbiol* 124, 85-96.
53. Greenberg, M., Dodds, M., and Tian, M. (2008) Naturally Occurring Phenolic Antibacterial Compounds Show Effectiveness against Oral Bacteria by a Quantitative Structure—Activity Relationship Study, *J. Agric. Food Chem.* 56, 11151-11156.
54. Fitzgerald, D. J., Stratford, M., Gasson, M. J., Ueckert, J., Bos, A., and Narbad, A. (2004) Mode of antimicrobial action of vanillin against *Escherichia coli, Lactobacillus plantarum* and *Listeria innocua*, *Journal of Applied Microbiology* 97, 104-113.
55. Ngarmsak, M., Delaquis, P., Toivonen, P., Ngarmsak, T., Ooraikul, B., and Mazza, G. (2006) Antimicrobial activity of vanillin against spoilage microorganisms in stored fresh-cut mangoes, *Journal of food protection* 69, 1724-1727.

What is claimed is:

1. A method for extracting bio-oils from vegetation containing sugar and lignin comprising the following steps:
   a) treating the vegetation with 70 kg NaOH per ton of the vegetation at 92° C. for 2 hours to produce a lignin residue;
   b) disk refining the lignin residue at 200 kwh/ODMT followed by enzymatic hydrolysis of the lignin residue;
   c) soaking the lignin residue, following step b), in 0.1M NaOH until a solution of the lignin residue and the 0.1M NaOH reaches a pH of 12.5;
   d) centrifuging the solution of the lignin residue and the 0.1M NaOH followed by filtering of the solution of the lignin residue and the 0.1M NaOH to produce a filtrate including lignin;
   e) precipitating the lignin in the filtrate to produce precipitated lignin by adding 2 M $H_2SO_4$ to the lignin in the filtrate until a pH of 3.0 is reached;
   f) filtering the precipitated lignin;
   g) freeze-drying the precipitated lignin;
   h) performing catalytic transfer hydrogenolysis using the precipitated lignin, ethanol, and a metal/C catalyst to produce a solid fraction and a liquid fraction;
   i) separating the solid fraction from the liquid fraction via centrifugation;
   j) collecting the liquid fraction and diluting the liquid fraction in a water:ethanol solvent;
   k) extracting from the liquid fraction from step j) sequentially: first in hexanes, followed by petroleum ether, then chloroform, and finally ethyl acetate to produce multiple fractions; and
   l) evaporating each fraction of the multiple fractions by vacuum evaporation until a solvent free bio-oil is produced.

2. The method of claim 1 and further comprising: administering the bio-oil onto a surface in need thereof.

3. The method of claim 2, wherein the surface is on an organism.

4. The method of claim 3 wherein the organism is a plant.

5. The method of claim 1 and further comprising: further fractioning the bio-oil into monomers.

6. An antimicrobial composition comprising: the bio-oil produced by the method of claim 1.

7. The composition of claim 6 and further comprising ethanol and water.

8. The method of claim 5, wherein the monomers include at least one of homosyringic acid, 4-ethyl-phenol, syringol, methyl 4-hydroxyhdrocinamate, 4-ethylguaiacol, ethyl-beta-(4-hydroxy-3methoxy-phenyl)-propionate, 5-tert-butylpyrogallol, creosol, 4-methoxy-3-(methoxymethyl)-phenol, 4-propylguaiacol, 2, 5-dimethoxybenzyl alcohol, ethyl homovanillate, homovanillyl alcohol, acetosyringone, (3, 4-dimethoxyphenyl)-methoxymethanol, and tyrosol.

* * * * *